J. A. TRIMBLE & I. R. CONCOFF.
DIRECTION INDICATOR FOR AUTOMOBILES.
APPLICATION FILED DEC. 9, 1915.
1,245,639.
Patented Nov. 6, 1917.
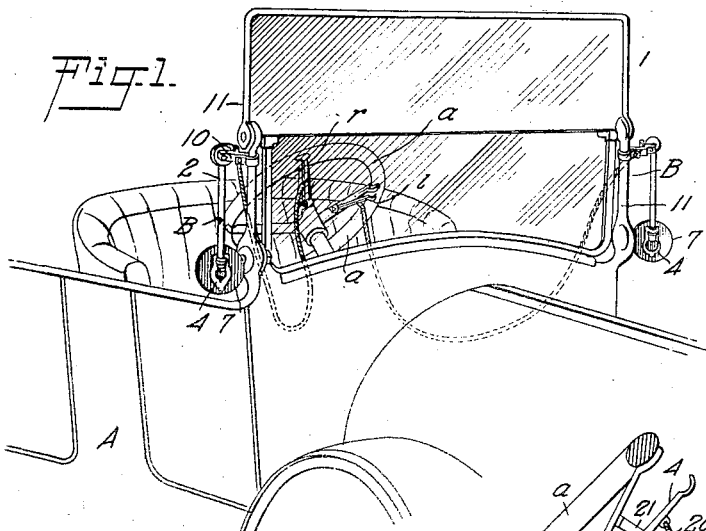
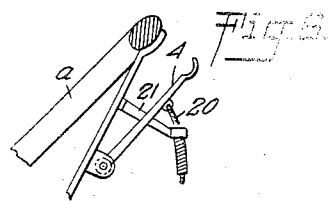
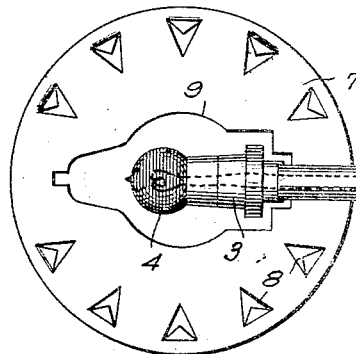
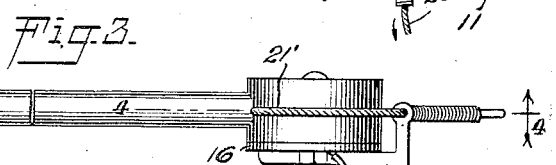
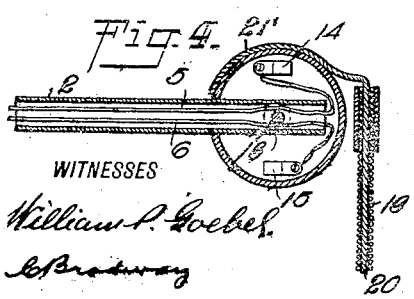
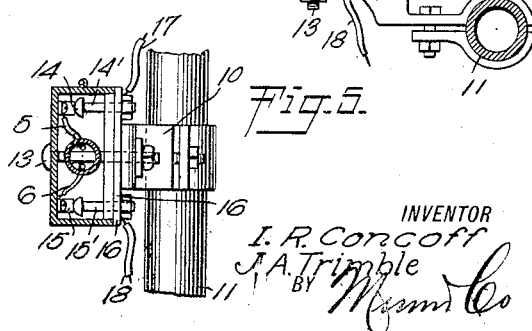

UNITED STATES PATENT OFFICE.

JOSEPH ARTHUR TRIMBLE AND ISAAC ROBERT CONCOFF, OF PORTLAND, OREGON.

DIRECTION-INDICATOR FOR AUTOMOBILES.

1,245,639.  Specification of Letters Patent.  Patented Nov. 6, 1917.

Application filed December 9, 1915. Serial No. 65,896.

*To all whom it may concern:*

Be it known that we, JOSEPH ARTHUR TRIMBLE and ISAAC ROBERT CONCOFF, citizens of the United States, and residents of Portland, in the county of Multnomah and State of Oregon, have invented a new and Improved Direction-Indicator for Automobiles, of which the following is a full, clear, and exact description.

This invention relates to signal devices especially adapted for automobiles and has for its object to provide means whereby the driver can give a signal when he desires to steer to the right or left or slow down or stop, the signal means being in the form of a semaphore or arm preferably mounted at each side of the wind shield dash of the automobile, whereby the semaphore can be caused to swing up and down at the right or left side, according to the direction in which the car is to be turned; and for adapting the semaphore for day and night service it is provided with a disk or target which can be seen by day and with which is associated a lamp that can be lighted for use at night.

A further object of the invention is the provision of a semaphore which when in hanging position causes the lamp circuit to be open, but when the arm is thrown upwardly the lamp circuit is automatically closed so as to light the lamp provided the power is turned on.

Still another object is to provide a signal device of the character referred to which can be operated from a lever or suitable device mounted on the steering wheel from a pedal or from a solenoid controlled by a pushbutton.

The invention has as a further object the construction of a target or signal which is so designed as to offer a minimum resistance to the wind, and which has a central opening in which the signal lamp is disposed.

With such objects in view, and others which will appear as the description proceeds, the invention comprises various novel features of construction and arrangement of parts which will be set forth with particularity in the following description and claim appended hereto.

In the accompanying drawings, which illustrate one embodiment of the invention and wherein similar characters of reference indicate corresponding parts in all the views, Figure 1 is a perspective view of the front portion of an automobile showing the signal devices mounted on the sides of the wind shield;

Fig. 2 is a front view of one of the signal devices;

Fig. 3 is a plan view thereof;

Fig. 4 is a vertical section on the line 4—4, Fig. 3;

Fig. 5 is a vertical sectional view on the line 5—5, Fig. 2; and

Fig. 6 is a detail view of one of the actuating levers mounted on the steering wheel for throwing a signal device to operative position.

Referring to the drawing, A designates an automobile which has a wind shield 1, and on the opposite sides of which are mounted the signal devices B which are used for day or night service and are adapted to be thrown outwardly to the side when it is desired to indicate that the car is to turn a corner, slow down or stop. In the present instance the signal devices are carried by the wind shield frame, but it is to be understood that they can be fastened to any other suitable point of the automobile. The signal device B comprises a tubular arm 2 which has on its outer end a lamp socket 3 for receiving a red or other electric lamp 4, and through the tubular arm extend the wires 5 and 6 for supplying current to the lamp. On the outer end of this arm 2 is fastened a vertically disposed disk 7 which serves for signaling during the day. This disk may be of any desired color, and in order to reduce wind resistance it is provided with a plurality of apertures 8 and a large central opening 9 in which the lamp 4 is disposed.

The signal device B normally hangs in a vertical position, the inner end of the arm 2 being mounted to swing on a bracket 10 which is fastened to the frame 11 of the wind shield. The arm 2 has a chambered enlargement 12 through which extends a pivot bolt 13 for fastening the arm to the bracket 10. In this chambered part 12 is a circuit make and break device which comprises spring contacts 14 and 15 connected with the wires 5 and 6, respectively, and coöperating with these contacts 14 and 15 are posts or fixed contacts 14' and 15' which are fastened in the fixed disk 16 which forms one wall of the chamber 12. The part of the chamber 12 to which the contacts 14 and 15 are fastened moves with the arm 2, while the part 16 is stationary, and when the arm 2 hangs in a vertical position the contacts 14 and 15 are out of engagement with the contacts 14' and 15', respectively. These contacts 14' and 15' have circuit wires 17 and 18 connected therewith, which wires are connected with a suitable source of current and with a switch, so that at night, by the closing of the switch, the signal lamps can be used.

The throwing of the signal device B from an inoperative hanging position to an outstanding operative position is accomplished through the use of a Bowdoin cable which has its outer tubular element 19 fastened to the bracket 10 and the inner longitudinally movable element 20 connected with the enlargement 12 of the arm 2 at the point 21'. This cable is shown in the present instance as connected with the steering wheel *a* of the automobile, there being on the steering wheel separate levers *r* and *l* for operating the right and left signal devices, respectively. The inner movable section 20 of the Bowdoin cable is connected with an operating lever, while the adjacent end of the outer section 19 is made fast to a suitable member 21 on the steering wheel. By means of this cable the steering wheel can be operated in the usual manner for steering a car without having any effect on the signal devices, but when a signal device is to be operated it is merely necessary to manipulate the lever *r* or *l* as the case may be. When the lever *r* or *l* is pulled upwardly the signal device connected therewith is moved from a pendant to a horizontal position, and when the pressure of the lever is removed the signal device drops to pendant position. Thus, by moving the lever successively the signal device is caused to swing up and down so that drivers of other vehicles, or pedestrians, can know how the car is to turn, or whether it is to stop or slow down.

From the foregoing description taken in connection with the accompanying drawings, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative and that such changes may be made when desired as fall within the scope of the appended claim.

Having thus described our invention, we claim as new and desire to secure by Letters Patent:

The combination of a steering wheel, with a direction indicator comprising a bracket having means for clamping it to a support spaced from the wheel, a signal-carrying arm pivotally mounted on the bracket, an actuator mounted directly on the steering wheel, a pull element connected with the arm and with the said actuator and a flexible tube through which the pull element extends and having one end fastened to the bracket and the other end fastened to the steering wheel, whereby the movement of the actuator causes the said element to operate the arm, said flexible tube and element being of such length as to permit the steering wheel to be freely turned, and the said tube and element being unsupported except at their ends.

In testimony whereof we have signed our names to this specification in the presence of two subscribing witnesses.

JOSEPH ARTHUR TRIMBLE.
I. ROBERT CONCOFF.

Witnesses:
  PHIL HARRIS,
  A. Y. BEACH.